(12) United States Patent
Gisler

(10) Patent No.: US 6,284,876 B1
(45) Date of Patent: Sep. 4, 2001

(54) FIBER-REACTIVE DISAZO DYESTUFFS

(75) Inventor: Markus Gisler, Rheinfelden (CH)

(73) Assignee: Clariant International, Ltd., Tortola (VG)

( * ) Notice: Subject to any disclaimer, the term of this patent is extended or adjusted under 35 U.S.C. 154(b) by 0 days.

(21) Appl. No.: 09/507,759

(22) Filed: Feb. 18, 2000

(30) Foreign Application Priority Data

Feb. 19, 1999 (GB) .................................... 9903683

(51) Int. Cl.[7] .......................... C09B 62/25; C09B 62/513; D06P 1/384; C09D 11/02
(52) U.S. Cl. ........................ 534/593; 534/637; 8/549; 106/31.47
(58) Field of Search .................... 534/637, 593; 8/549; 106/31.47

(56) References Cited

U.S. PATENT DOCUMENTS

| | | | |
|---|---|---|---|
| 4,746,732 | * 5/1988 | Tzikas | 534/637 |
| 4,917,705 | 4/1990 | Mausezahl et al. | 8/549 |
| 4,935,501 | 6/1990 | Tzikas | 534/634 |
| 4,990,599 | 2/1991 | Mausezahl et al. | 534/634 |
| 4,996,304 | 2/1991 | Tzikas | 534/637 |
| 5,166,325 | 11/1992 | Herd et al. | 534/637 |
| 5,241,057 | * 8/1993 | Jager | 534/637 |
| 5,319,074 | * 6/1994 | Reddig et al. | 534/637 X |
| 5,436,324 | 7/1995 | Reddig et al. | 534/625 |
| 5,508,389 | * 4/1996 | Mischke et al. | 534/637 X |
| 5,538,518 | 7/1996 | Reddig et al. | 8/549 |

FOREIGN PATENT DOCUMENTS

| | | |
|---|---|---|
| 0167490 | 1/1986 | (EP) . |
| 0972810 | 7/1999 | (EP) . |
| 2262533 | 6/1993 | (GB) . |

* cited by examiner

*Primary Examiner*—Fiona T. Powers
(74) *Attorney, Agent, or Firm*—Andrew F. Sayko, Jr.; Scott E. Hanf

(57) ABSTRACT

The invention is concerned with compounds according to the formula (I)

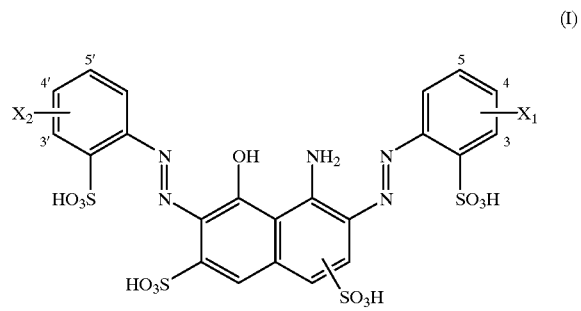

and salts thereof, or a mixture of such compounds or salts.

These compounds are useful as fiber-reactive dyestuffs in dyeing and printing hydroxy-group-containing and nitrogen-containing organic substrates.

6 Claims, No Drawings

FIBER-REACTIVE DISAZO DYESTUFFS

This invention relates to fiber-reactive disazo compounds and a process for their production. These compounds are suitable for use as fiber-reactive dyestuffs in any conventional dyeing or printing processes.

More particularly, the invention provides compounds of formula (I)

(I)

[Structure of formula (I): a naphthalene core bearing OH and $NH_2$ groups, with two $SO_3H$ groups (positions 3 and 4), connected via azo linkages to two substituted phenyl groups: one bearing $X_2$ and $HO_3S$ (positions 3', 4', 5'), and the other bearing $X_1$ and $SO_3H$ (positions 3, 4, 5)]

and salts thereof, or a mixture of such compounds or salts, in which
- $X_1$ is —$SO_2Z$,
- $X_2$ is —NRQ,
- Z is a group —CH=$CH_2$ or —$CH_2CH_2Y$ in which Y is a group which can be split off under alkaline conditions,
- R is hydrogen, $C_{1-4}$alkyl or $C_{1-4}$hydroxyalkyl
- Q is

[Two pyrimidine structures: one with F at 2,4,6 positions (H at 5); another with F at 2,4,6 and Cl at 5]

or

Preferred meanings of Y are —$OSO_3H$, —Cl and —$SSO_3H$, especially preferred is —$OSO_3H$.

Preferably, R is hydrogen.

More preferred compounds of formula (I) correspond to formula (Ia)

(Ia)

[Structure of formula (Ia)]

and salts thereof.

Preferably, the —$SO_3H$ group is in 3 position.
Preferably, the —$SO_2Z$ group is in 4 position.

When a compound of formula (I) is in salt form, the cation associated with the sulpho groups and any carboxy group is not critical and may be any one of those non-chromophoric cations conventional in the field of fiber-reactive dyes provided that the corresponding salts are water-soluble. Examples of such cations are alkali metal cations and unsubstituted and substituted ammonium cations, e.g., lithium, sodium, potassium, ammonium, mono-, di- and tri-ethanolammonium.

The preferred cations are the alkali metal cations and ammonium, with sodium and potassium being the most preferred.

In a compound of formula (I) the cations of the sulpho groups can be the same or different, e.g., they can also be a mixture of the above mentioned cations meaning that the compound of formula (I) can be in a mixed salt form.

The invention further provides a process for the preparation of compounds of formula (I) or mixtures thereof which is characterized by coupling a compound of formula (II)

(II)

[Structure of formula (II)]

with a diazotized amine of formula (III)

(III)

[Structure of formula (III)]

wherein $X_1$ is the rest —$SO_2Z$ and $X_2$ is —NRQ, and optionally compounds with the rest —$SO_2CH_2CH_2Y$ are converted to compounds with the rest —$SO_2CH=CH_2$.

Compounds of formula (II) are obtained by diazotisation and coupling of appropriate amines with an 1-amino-8-hydroxynaphthalene disulfonic acid.

Compounds of formula (III) carrying the rest —NRQ are obtained by condensation of the appropriate starting material with 2,4,6-trifluoro- or 5-chloro-2,4,6-trifluoropyrimidine.

The condensation reaction of the amino compound with 2,4,6-trifluoropyrimidine or 5-chloro-2,4,6-trifluoropyrimidine is carried out in a manner known per se, preferably at 0° to 50° C., more preferably at 10° to 20° C., and at a pH of about 5–7.

The diazotisation and coupling reactions are effected in accordance with conventional methods; coupling is preferably carried out at 5° to 30° C., the first coupling to a compound of formula (II) in an acidic medium at a pH of 0 to 4, the second coupling to a compound of formula (I) in a weakly acidic to weakly basic reaction medium at a pH of 4 to 9.

The compounds of formula (I) may be isolated in accordance with known methods, for example, by conventional salting out with an alkali metal salt, filtering and drying optionally in vacuum and at slightly elevated temperatures.

Depending on the reaction and isolation conditions, a compound of formula (I) is obtained in free acid or preferably salt form or even mixed salt form containing, for example, one or more of the above mentioned cations. It may be converted from free acid to a salt form or mixture of salt forms or vice versa or from one salt form to another by conventional means.

It should be noted that any group Q which is a pyrimidinyl radical with a floating fluoro substituent according to the formula

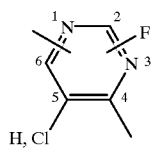

can occur in two isomeric forms where the floating fluoro substituent is bound either to the 2- or to the 6-position.

In general, it is preferred to use this mixture as it is without resorting to the isolation of a single isomer for use, but should this be desired it can be readily achieved by conventional methods.

The compounds of formula (I) and mixtures thereof are useful as fiber-reactive dyestuffs for dyeing or printing hydroxy group- or nitrogen-containing organic substrates. Preferred substrates are leather and fiber material comprising natural or synthetic polyamides and, particularly, natural or regenerated cellulose such as cotton, viscose, lyocell fibers and spun rayon. The most preferred substrate is textile material comprising cotton.

Dyeing or printing is effected in accordance with known methods conventional in the fiber-reactive dyestuff field. Preferably, for the compounds of formula (I) the exhaust dyeing method is used at temperatures within the range of 30° to 100° C., particularly at 40°–80° C., respectively, whereby a liquor to goods ratio of 6:1 to 30:1 is used and more preferably of 10:1 to 20:1.

The compounds of this invention have good compatibility with known fiber-reactive dyes; they may be applied alone or in combination with appropriate fiber-reactive dyestuffs of the same class having analogous dyeing properties such as common fastness properties and the extent of ability to exhaust from the dyebath onto fiber. The dyeings obtained with such combination mixtures have good fastness properties and are comparable to those obtained with a single dyestuff.

The compounds of formula (I) give good exhaust and fixation yields when used as dyestuffs. Moreover, any unfixed compound is easily washed off the substrate. The dyeings and prints derived from the compounds of formula (I) exhibit good light fastness and good wet fastness properties such as wash, water, seawater and sweat fastness. They also exhibit good resistance to oxidation agents such as chlorinated water, hydrochloride bleach, peroxide bleach and perborate-containing washing detergents.

The new dyestuffs can also be used in the preparation of printing inks which are suitable for the ink jet process.

The following examples illustrate the invention. In the examples all parts and percentages are by weight unless indicated to the contrary, and all temperatures are given in degrees Centigrade.

EXAMPLE 1

497 parts 2-amino-5-(2'-sulfatoethylsulfonyl)benzene sulfonic acid are put into 1500 parts water under stirring and the violet suspension is cooled to about 0° to 5° C. by addition of about 600 parts ice. At this temperature about 190 parts of a 40% sodium nitrite solution are added dropwise and at the same time 319 parts 1-amino-8-hydroxynaphthalene-3, 6-disulfonic acid are suspended in 1000 parts water. This suspension is combined with the first diazo suspension and the pH value is raised to 3 to 4 by addition of about 1250 parts of a 15% sodium carbonate solution.

Independently, 332 parts of a condensation product obtained from 2,4-diaminobenzene sulfonic acid and 2,4,6-trifluoropyrimidine are diazotized and this second diazo suspension added to the suspension of the monoazo dyestuff. The pH value is raised further to 6 to 8 by addition of about 75 parts of the 15% sodium carbonate solution and the obtained solution spray dried. About 2000 parts of a bluish black salt containing powder are obtained which dyes cellulose fibers in deep navy shades. The dyestuff corresponds to the formula

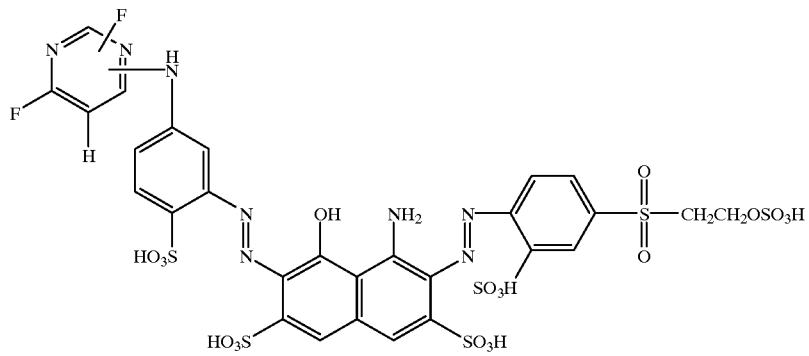

and the dyeings have excellent fastnesses whereby the unfixed dyestuff can easily be washed out, even from deep dyeings.

EXAMPLE 2

If the solution of the dyestuff obtained in Example 1 is treated at pH 10 with 400 parts of a 10% sodium hydroxide solution, the dyestuff in its vinylsulfonic form is obtained which corresponds to the formula

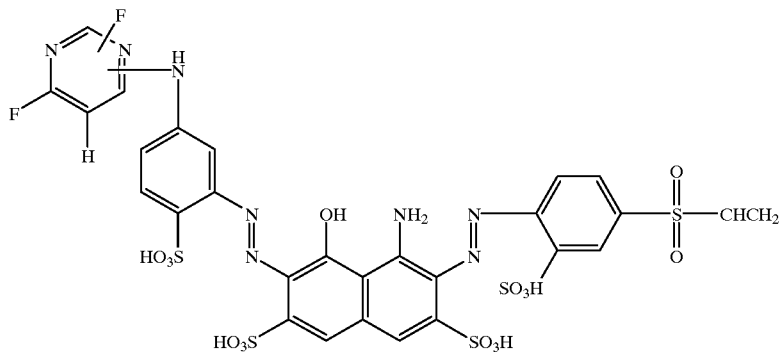

After neutralization of the solution with hydrochloric acid and spray drying of this solution, about 2100 parts of a bluish black salt containing powder are obtained which dyes cellulose fibers in deep navy shades. The fastnesses and the ability to be washed out correspond to the dyeings obtained in Example 1.

When using an analogous process and varying the amines to be diazotized, optionally also changing the sequence of coupling reactions, dyestuffs as illustrated in Table 1 can be obtained.

TABLE 1

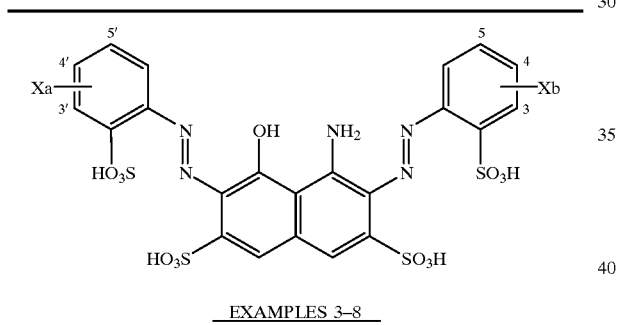

EXAMPLES 3–8

| Ex. No. | Xa (Pos.) | Xb (Pos.) |
|---|---|---|
| 3 | (pyrimidine-NH, 5′) | —SO₂CH₂CH₂OSO₃H (4) |
| 4 | (pyrimidine-NH, 5′) | —SO₂CH=CH₂ (4) |
| 5 | (chloropyrimidine-NH, 5′) | —SO₂CH₂CH₂OSO₃H (4) |

TABLE 1-continued

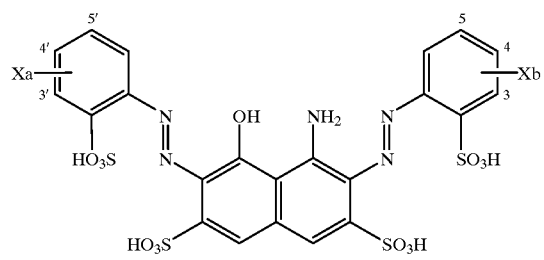

EXAMPLES 3–8

| Ex. No. | Xa (Pos.) | Xb (Pos.) |
|---|---|---|
| 6 | (chloropyrimidine-NH, 5′) | —SO₂CH=CH₂ (4) |
| 7 | (chloropyrimidine-NH, 5′) | —SO₂CH₂CH₂OSO₃H (5) |
| 8 | (chloropyrimidine-NH, 5′) | —SO₂CH=CH₂ (5) |

Application Example A 0.3 Part of the dyestuff of Example 1 is dissolved in 100 parts of demineralized water and 3 g Glauber's salt (calcined) is added. The dyebath is heated to 50° C., then 10 parts of cotton fabric (bleached) are added. After 30 minutes at 50° C., 0.4 part of sodium carbonate (calcined) is added to the bath. During the addition of sodium carbonate the temperature is kept at 50° C. Subsequently, the dyebath is heated to 60° C., and dyeing is effected for a further one hour at 60° C.

The dyed fabric is then rinsed with running cold water for 3 minutes and afterwards with running hot water for a further 3 minutes. The dyeing is washed at the boil for 15 minutes in 500 parts of demineralized water in the presence of 0.25 part of Marseille soaps. After being rinsed with running hot water (for 3 minutes) and centrifuged, the dyeing is dried in a cabinet drier at about 70° C. A navy cotton dyeing is obtained showing good fastness properties, and particularly high wet fastness properties, which is stable towards oxidative influences.

Application Example B

To a dyebath containing in 100 parts of demineralized water and 3 g Glauber's salt (calcined) 10 parts of cotton fabric (bleached) are added. The bath is heated to 50° C. within 10 minutes, and 0.5 part of the dyestuff of Example 1 is added. After a further 30 minutes at 50° C., 1 part of sodium carbonate (calcined) is added. The dyebath is then heated to 60° C. and dyeing is continued at 60° C. for a further 45 minutes.

The dyed fabric is rinsed with running cold and then hot water and washed at the boil according to the method of application Example A. After rinsing and drying a navy cotton dyeing is obtained which had the same good fastness properties as indicated in Application Example A. Similarly, the dyestuffs of Examples 2–8 or mixtures of the exemplified dyestuffs are employed to dye cotton in accordance with the method described in Application Example A or B. The cotton dyeings thus obtained are navy and show good fastness properties.

Application Example C

A printing paste consisting of

| | |
|---|---|
| 40 | parts of the dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods.

The printed fabric is dried and fixed in steam at 102–104° C. for 4–8 minutes. It is rinsed in cold and then hot water, washed at the boil (according to the method described in Application Example A) and dried. An navy print is obtained which has good general fastness properties.

Similarly, the dyestuffs of Examples 2 to 8 or mixtures of the exemplified dyestuffs are employed to print cotton in accordance with the method given in Application Example C. All prints obtained are navy and show good fastness properties.

Application Example D 2.5 parts of the dyestuff obtained in Example 1 are dissolved with stirring at 25° C. in a mixture of 20 parts diethyleneglycol and 77.5 parts water to obtain a printing ink suitable for ink jet printing.

The dyestuff of Examples 2 to 8 or dyestuff mixtures of Examples 1 to 8 can also be used in a manner analogous to that described in Application Examples D.

What is claimed is:

1. A process for the preparation of compounds of formula (I)

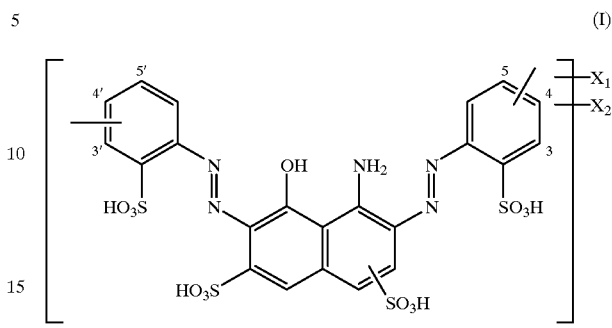

or a salt thereof, or a mixture of such compounds or salts, in which $X_1$ is —$SO_2Z$, $X_2$ is —NRQ, Z is a group —CH=$CH_2$ or —$CH_2CH_2Y$ in which Y is a group which can be split off under alkaline conditions, each R is independently hydrogen, $C_{1-4}$alkyl or $C_{1-4}$hydroxyalkyl Q is

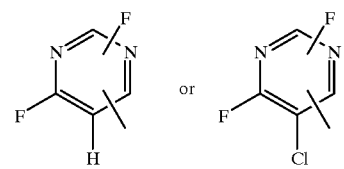

or mixtures thereof which is characterized by coupling a compound of formula (II)

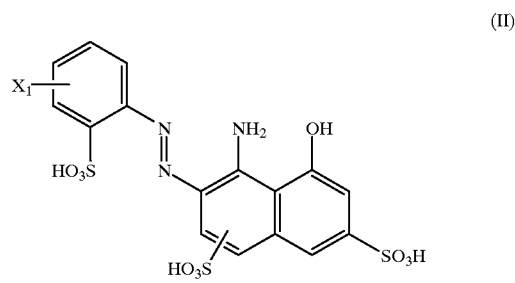

with a diazotized amine of formula (II)

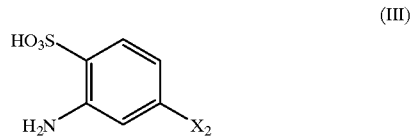

(III)

in which $X_1$ is the moiety —$SO_2Z$ and $X_2$ is —NRQ, and optionally compounds with the moiety —$SO_2CH_2CH_2Y$ converting to compounds with the moiety —$SO_2CH$=$CH_2$.

2. The process of claim 1 wherein compounds according to formula correspond to formula (1a)

(Ia)

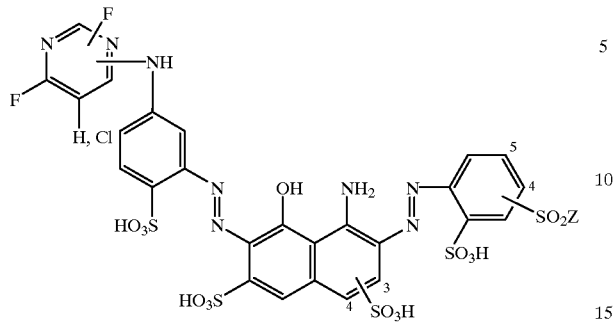

and salts thereof.

3. A process for the preparation of printing inks comprising the use of a dyestuff or a mixture of dyestuffs according to formula (I):

(I)

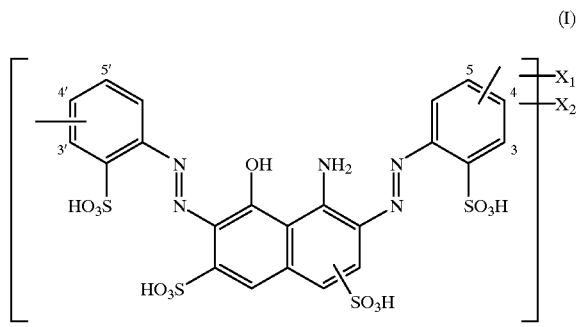

or salt thereof, or a mixture of such compound or salts, in which $X_1$ is —$SO_2Z$, $X_2$ is —NRQ, Z is a group —CH=$CH_2$ or —$CH_2CH_2Y$ in which Y is a group which can be split off under alkaline conditions, each R is independently hydrogen, $C_{1-4}$alkyl or $C_{1-4}$hydroxyalkyl Q is

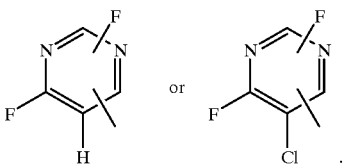

4. A process of dyeing or printing hydroxy-group-containing or nitrogen-containing organic substrates by applying thereto a compound produced according to the process of claim 1, their salts or mixture thereof.

5. A process of dyeing or printing hydroxy-group-containing or nitrogen-containing organic substrates with a compound produced according to the process of claim 1, their salts or mixture thereof.

6. A process of dyeing or printing textile material according to the process of claim 5 wherein said textile material consists of or contains cotton.

* * * * *